(12) United States Patent
Ranjbar et al.

(10) Patent No.: US 11,619,699 B2
(45) Date of Patent: Apr. 4, 2023

(54) AOA/AOD CALCULATION IN THE PRESENCE OF CARRIER FREQUENCY OFFSET

(71) Applicant: SHENZHEN GOODIX TECHNOLOGY CO., LTD., Shenzhen (CN)

(72) Inventors: Mohammad Ranjbar, San Diego, CA (US); Amir Dezfooliyan, San Diego, CA (US); Waleed Younis, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 260 days.

(21) Appl. No.: 17/006,834

(22) Filed: Aug. 30, 2020

(65) Prior Publication Data
US 2022/0065974 A1    Mar. 3, 2022

(51) Int. Cl.
| | | |
|---|---|---|
| G01S 3/10 | (2006.01) |
| G01S 3/04 | (2006.01) |
| H04B 1/04 | (2006.01) |
| H04B 1/16 | (2006.01) |
| G01S 3/48 | (2006.01) |

(52) U.S. Cl.
CPC ............... *G01S 3/10* (2013.01); *G01S 3/043* (2013.01); *H04B 1/04* (2013.01); *H04B 1/16* (2013.01); *G01S 3/48* (2013.01)

(58) Field of Classification Search
CPC ..... G01S 3/10; G01S 3/28; G01S 3/32; G01S 3/46; G01S 3/043; G01S 13/44; H04B 1/04; H04B 1/16; H04B 7/06; H04B 7/08; H04B 7/0413; H04B 7/0456; H04B 17/318; H04B 17/336; H04L 25/02; H04L 25/03; H04W 4/80; H04W 24/10; H04W 64/00
USPC .......... 342/420, 442; 375/219, 295–297, 316
See application file for complete search history.

(56) References Cited

U.S. PATENT DOCUMENTS

| | | |
|---|---|---|
| 6,489,923 B1 | 12/2002 | Bevan |
| 9,860,096 B1 | 1/2018 | Ganwani et al. |
| 10,330,783 B1 | 6/2019 | Yuan et al. |
| 10,594,517 B1* | 3/2020 | Lo ......................... H04L 25/021 |
| 11,228,469 B1* | 1/2022 | Shpak ................... H04L 25/025 |
| 2013/0315353 A1 | 11/2013 | Belloni et al. |

(Continued)

FOREIGN PATENT DOCUMENTS

| | | |
|---|---|---|
| CN | 104040367 A | 9/2014 |
| CN | 107787534 A | 3/2018 |
| CN | 109085563 A | 12/2018 |

(Continued)

*Primary Examiner* — Shawkat M Ali
(74) *Attorney, Agent, or Firm* — Kilpatrick Townsend & Stockton LLP

(57) ABSTRACT

A receiver circuit is disclosed. The receiver circuit includes one or more receiver antennas configured to receive a plurality of RF signals transmitted from a transmitter circuit including one or more transmit antennas, an RF chain configured to generate a plurality of digitized samples of the received RF signals, and a controller configured to receive the digitized samples, to calculate a plurality of additional samples, and to calculate a measured angle of arrival or angle of departure (AoA or AoD) of the RF signals based on the digitized samples and the calculated additional samples.

16 Claims, 3 Drawing Sheets

(56) References Cited

U.S. PATENT DOCUMENTS

2020/0178054 A1* 6/2020 Simileysky .......... H04B 17/336
2022/0069886 A1* 3/2022 Ranjbar ............... H04B 7/0413

FOREIGN PATENT DOCUMENTS

| CN | 110333478 A | 10/2019 |
|----|-------------|---------|
| EP | 3660532 A1 | 6/2020 |
| WO | 2020117409 A2 | 6/2020 |

* cited by examiner

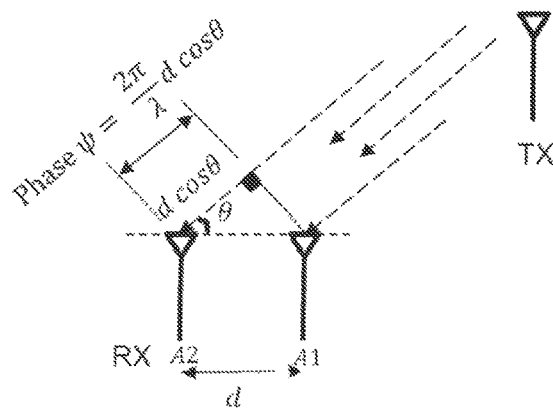
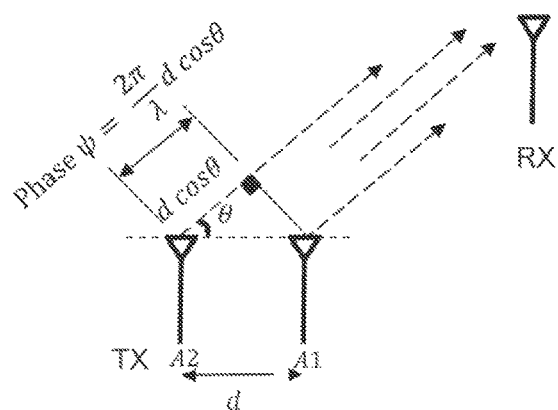
Figure 2A                              Figure 2B
| A1 | y1 |    | y3 |    | y5 |    |
|----|----|----|----|----|----|----|
| A2 |    | y2 |    | y4 |    | y6 |
|    | T1 | T2 | T3 | T4 | T5 | T6 |
Figure 3
| A1 | y1   | y2c1 | y3   | y4c1 | y5   | y6c1 |
|----|------|------|------|------|------|------|
| A2 | y1c2 | y2   | y3c2 | y4   | y5c2 | y6   |
|    | T1   | T2   | T3   | T4   | T5   | T6   |
Figure 4

| A1 | y1 | ... |    |
|----|----|----|----|
| ...| ...| ...| ...|
| AN |    | ... | yN |
|    | T1 | ... | TN |

Figure 5

| A1   | y1     | y2c1   | ...  | yN-1c1 | yNc1   |
|------|--------|--------|------|--------|--------|
| A2   | y1c2   | y2     | ...  | yN-1c2 | yNc2   |
| ...  | ...    | ...    | ...  | ...    |        |
| AN-1 | y1cN-1 | y2cN-1 | ...  | yN-1   | yNcN-1 |
| AN   | y1cN   | y2cN   | ...  | yN-1cN | yN     |
|      | T1     | T2     | ...  | TN-1   | TN     |

Figure 6

AOA/AOD CALCULATION IN THE PRESENCE OF CARRIER FREQUENCY OFFSET

TECHNICAL FIELD

The subject matter described herein relates to determining Angle of Arrival (AoA) or Angle of Departure (AoD), and more particularly to determining AoA or AoD accurately despite carrier frequency offset (CFO).

BACKGROUND

RF signals transmitted from a transmitter circuit based on a high carrier frequency oscillator are frequently received at a receiver circuit based on a local high carrier frequency oscillator, where the carrier frequency of the transmitter oscillator and the carrier frequency of the receiver oscillator are slightly different. The carrier frequency offset (CFO) causes errors in traditional techniques for determining AoA or AoD. Techniques for accurately calculating AoA or AoD in the presence of CFO are needed in the art.

SUMMARY

One inventive aspect is a receiver circuit. The receiver circuit includes one or more receiver antennas configured to receive a plurality of RF signals transmitted from a transmitter circuit including one or more transmit antennas, an RF chain configured to generate a plurality of digitized samples of the received RF signals, and a controller configured to receive the digitized samples, to calculate a plurality of additional samples, and to calculate a measured angle of arrival or angle of departure (AoA or AoD) of the RF signals based on the digitized samples and the calculated additional samples.

In some embodiments, the RF signals are either transmitted by first and second transmit antennas of the transmitter circuit or are received by first and second receive antennas of the receiver circuit.

In some embodiments, a first set of digitized samples are samples of the RF signals either transmitted by the first transmit antenna of the transmitter circuit or received by the first receive antenna of the receiver circuit, and a second set of digitized samples are samples of the RF signals either transmitted by the second transmit antenna of the transmitter circuit or received by the second receive antenna of the receiver circuit.

In some embodiments, a first set of additional samples is calculated based on the first set of digitized samples, and a second set of additional samples is calculated based on the second set of digitized samples.

In some embodiments, the first set of digitized samples are samples of the RF signals taken at a plurality of first sample times, the second set of digitized samples are samples of the RF signals taken at a plurality of second sample times, and each of the first sample times is different from each of the second sample times.

In some embodiments, each of the additional samples of the first set of additional samples corresponds with one of the second sample times, and each of the additional samples of the second set of additional samples corresponds with one of the first sample times.

In some embodiments, the controller is configured to calculate the measured AoA or AoD based on the digitized samples and the calculated additional samples corresponding with the plurality of first sample times and corresponding with the plurality of second sample times.

In some embodiments, the RF signals are transmitted by a single transmit antenna of the transmitter circuit and are received by a plurality of receive antennas of the receiver circuit.

In some embodiments, the RF signals are transmitted by a plurality of transmit antennas of the transmitter circuit and are received by a single receive antenna of the receiver circuit.

In some embodiments, the RF chain is selectably connectable to each of a plurality of receive antennas.

Another inventive aspect is a method of using a receiver circuit, the method including with one or more receiver antennas, receiving a plurality of RF signals transmitted from a transmitter circuit including one or more transmit antennas, with an RF chain, generating a plurality of digitized samples of the received RF signals, with a controller, receiving the digitized samples, with the controller, calculating a plurality of additional samples, and with the controller, calculating a measured angle of arrival or angle of departure (AoA or AoD) of the RF signals based on the digitized samples and the calculated additional samples.

In some embodiments, the RF signals are either transmitted by first and second transmit antennas of the transmitter circuit or are received by first and second receive antennas of the receiver circuit.

In some embodiments, a first set of digitized samples are samples of the RF signals either transmitted by the first transmit antenna of the transmitter circuit or received by the first receive antenna of the receiver circuit, and a second set of digitized samples are samples of the RF signals either transmitted by the second transmit antenna of the transmitter circuit or received by the second receive antenna of the receiver circuit.

In some embodiments, a first set of additional samples is calculated based on the first set of digitized samples, and a second set of additional samples is calculated based on the second set of digitized samples.

In some embodiments, the first set of digitized samples are samples of the RF signals taken at a plurality of first sample times, the second set of digitized samples are samples of the RF signals taken at a plurality of second sample times, and each of the first sample times is different from each of the second sample times.

In some embodiments, each of the additional samples of the first set of additional samples corresponds with one of the second sample times, and each of the additional samples of the second set of additional samples corresponds with one of the first sample times.

In some embodiments, the method further comprises, with the controller, calculating the measured AoA or AoD based on the digitized samples and the calculated additional samples corresponding with the plurality of first sample times and corresponding with the plurality of second sample times.

In some embodiments, the RF signals are transmitted by a single transmit antenna of the transmitter circuit and are received by a plurality of receive antennas of the receiver circuit.

In some embodiments, the RF signals are transmitted by a plurality of transmit antennas of the transmitter circuit and are received by a single receive antenna of the receiver circuit.

In some embodiments, the method further includes, selectably connecting the RF chain to each of a plurality of receive antennas.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

FIG. 2A is a schematic diagram of two antenna systems illustrating AoA.

FIG. 2B is a schematic diagram of two antenna systems illustrating AoD.

FIG. 3 is a graphic illustration of received samples used for calculating AoA or AoD.

FIG. 4 is a graphic illustration of received and calculated samples used for calculating AoA or AoD.

FIG. 5 is a graphic illustration of received samples used for calculating AoA or AoD.

FIG. 6 is a graphic illustration of received and calculated samples used for calculating AoA or AoD.

When practical, similar reference numbers denote similar structures, features, or elements.

DETAILED DESCRIPTION

Particular embodiments of the invention are illustrated herein in conjunction with the drawings. Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Figure 1A:
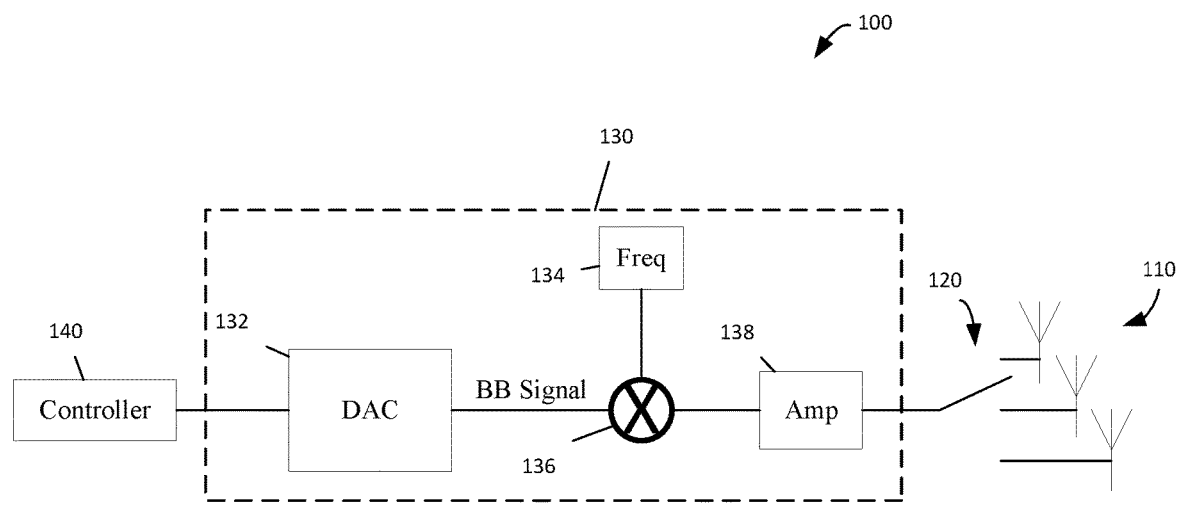
FIG. 1A is a schematic diagram of an embodiment of a transmitter circuit according to an embodiment.
Figure 1B:
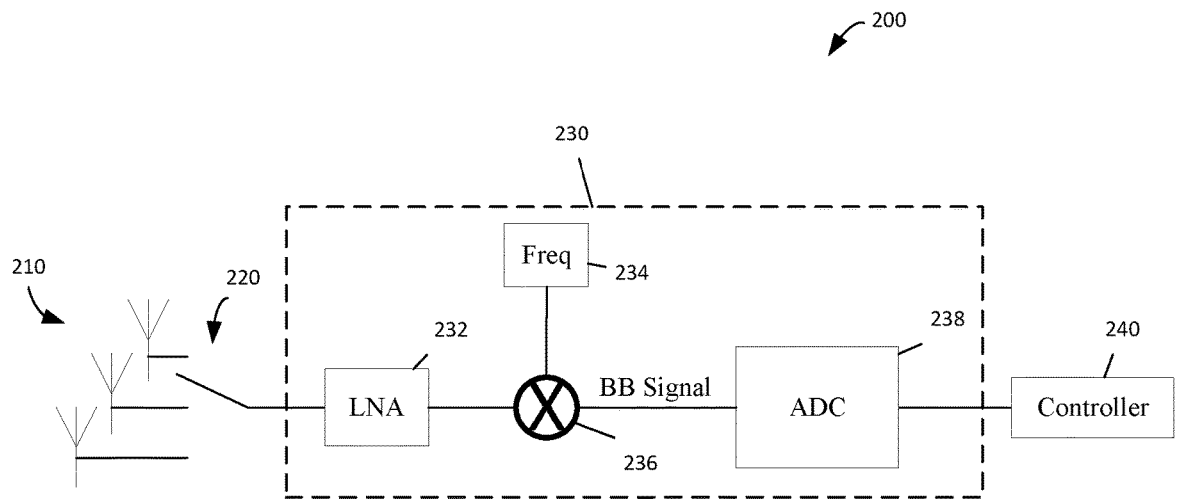
FIG. 1B is a schematic diagram of an embodiment of a receiver circuit according to an embodiment.

Embodiments illustrate circuits and methods for determining a measured angle of arrival (AoA) or angle of departure (AoD) of a signal received at a receiver circuit having multiple antennas generating signals which are digitized with a single RF chain. The AoA or AoD is determined based on a number of signal samples for each of one or more sampling times. Because the RF chain can generate only one sample per sampling time, the other samples for each sampling time are calculated. FIGS. 1A and 1B respectively illustrate schematic diagrams of a receiver circuit and a transmitter circuit. FIGS. 2A and 2B respectively illustrate AoA and AoD. FIGS. 3 and 4 illustrate received and calculated samples used for determining AoA or AoD. FIG. 5 is a block illustrating a system using an array of N antennas.

FIG. 1A is a schematic diagram of an embodiment of a transmitter circuit 100 according to an embodiment. Transmitter circuit 100 includes antenna or antenna array 110, switch 120, RF chain 130, and controller 140. Transmitter circuit 100 illustrates a particular example. Other embodiments of transmitter circuits may be used.

Antenna or antenna array 110 may be any antenna or antenna array. For example, in some embodiments, antenna or antenna array 110 includes 1, 2, 3, 4, or more antennas. In some embodiments, antenna or antenna array 110 includes a linear antenna array. In some embodiments, antenna or antenna array 110 includes a two dimensional antenna array, for example, having multiple rows of linear antenna arrays.

In embodiments where antenna or antenna array 110 includes one antenna, the one antenna may be connected directly to RF chain 130, and switch 120 may be omitted. In embodiments where antenna or antenna array 110 includes multiple antennas, each antenna may be directly connected to a separate RF chain. Each of the RF chains may have the features of RF chain 130.

Antenna or antenna array 110 may be configured to transmit RF signals to a receiver circuit, such as receiver circuit 200 described below with reference to FIG. 1B. The RF signals include a high frequency signal at a carrier frequency modulated with a low frequency information signal. The high frequency signal is transmitted by one of the antennas from antenna or antenna array 110, for example, according to a programmable electrical connection formed by switch 120, as controlled by controller 140. At least because of reflections, a particular signal transmitted by transmitter circuit 100 may arrive at the receiver after having traversed each of multiple transmission paths. Each of the transmission paths may terminate at the receiver with a different AoA. Additionally, the RF signals transmitted by antenna or antenna array 110 is transmitted from transmitter 100 with an AoD.

Controller 140 is configured to provide a digital signal to RF chain 130, where the digital signal encodes the information signal to be transmitted by antenna or antenna array 110.

RF chain 130 includes digital to analog converter (DAC) 132, mixer 136, frequency synthesizer 134, and power amplifier (PA) 138. RF chain 130 is an example only, and embodiments of other RF chains may alternatively be used. For example, in some embodiments, one or more amplifiers, and/or filters may be included, as understood by those of skill in the art.

The digital signal is processed by the digital to analog converter 132 to generate an analog baseband signal representing the digital signal, using techniques known in the art. Various digital to analog converter structures known in the art may be used.

Mixer 136 receives the analog baseband signal output from the digital to analog converter 132 and an oscillator signal at the carrier frequency generated by frequency synthesizer 134. In response to the analog baseband signal and the oscillator signal, mixer 136 up converts the analog baseband signal from the analog-to-digital converter 132 to a high frequency signal, using techniques known in the art. Various mixer structures known in the art may be used. The resulting high frequency signal is at the carrier frequency in this modulated so as to include the information of the low frequency information signal.

Power amplifier 138 is configured to receive the high frequency signal the high frequency signal is driven to one of the antennas from antenna or antenna array 110, for example, according to a programmable electrical connection formed by switch 120, as controlled by controller 140. The power amplifier 138 drives the high frequency signal to one of the antennas using techniques known in the art. Various power amplifier structures known in the art may be used.

As understood by those of skill in the art, using communication connectivity not illustrated in FIG. 1A, control signals from controller 140 may control certain variable functionality of switch 120, power amplifier 138, frequency synthesizer 134, mixer 136, and digital to analog converter 132, for example, as understood by those of skill in the art.

The control signals from controller 140 may, for example, control switch 120 to control which of multiple antennas RF chain 130 drives the high frequency signal with.

In embodiments having multiple antennas each connected to one of multiple RF chains, controller 140 may generate control signals for each of the RF chains.

FIG. 1B is a schematic diagram of an embodiment of a receiver circuit 200 according to an embodiment. Receiver circuit 200 includes antenna or antenna array 210, switch 220, RF chain 230, and controller 240. Receiver circuit 200 illustrates a particular example. Other embodiments of receiver circuits may be used.

Antenna or antenna array 210 may be any antenna or antenna array. For example, in some embodiments, antenna or antenna array 210 includes 1, 2, 3, 4, or more antennas. In some embodiments, antenna or antenna array 210 includes a linear antenna array. In some embodiments, antenna or antenna array 210 includes a two dimensional antenna array, for example, having multiple rows of linear antenna arrays.

In embodiments where antenna or antenna array 210 includes one antenna, the one antenna may be connected directly to RF chain 230, and switch 220 may be omitted. In embodiments where antenna or antenna array 210 includes multiple antennas, each antenna may be directly connected to a separate RF chain. Each of the RF chains may have the features of RF chain 230.

Antenna or antenna array 210 may be configured to receive RF signals generated by a transmitter, such as transmitter 100 described above with reference to FIG. 1A. At least because of reflections, a particular signal transmitted by the transmitter may arrive at the antenna or antenna array 210 after having traversed each of multiple transmission paths. Each of the transmission paths may terminate at the antenna or antenna array 210 with a different AoA. Additionally, the RF signals transmitted by the transmitter 100 is transmitted with an AoD.

RF chain 230 includes low noise amplifier (LNA) 232, frequency synthesizer 234, mixer 236, and analog to digital converter (ADC) 238. RF chain 230 is an example only, and embodiments of other RF chains may alternatively be used. For example, in some embodiments, one or more amplifiers, and/or filters may be included, as understood by those of skill in the art.

Low noise amplifier 232 is configured to receive a high frequency signal at a carrier frequency and modulated with a low frequency information signal. The high frequency signal is received from one of the antennas from antenna or antenna array 210, for example, according to a programmable electrical connection formed by switch 220, as controlled by controller 240. The high frequency signal is amplified by low noise amplifier 232 to generate an amplified RF signal, using techniques known in the art. Various low noise amplifier structures known in the art may be used.

Mixer 236 receives the amplified RF signal output from the low noise amplifier 232 and an oscillator signal at or substantially at the carrier frequency generated by frequency synthesizer 234. In response to the amplified RF signal and the oscillator signal, mixer 236 down converts the amplified RF signal from the low noise amplifier 232 to a baseband signal, using techniques known in the art. Various mixer structures known in the art may be used. The resulting baseband signal includes information of the low frequency information signal.

The baseband signal is then processed by the analog-to-digital converter 238 to generate a digital signal representing the baseband signal, using techniques known in the art. Various analog-to-digital converter structures known in the art may be used.

Controller 240 receives the digital representation of the baseband signal.

As understood by those of skill in the art, using communication connectivity not illustrated in FIG. 1B, control signals from controller 240 may control certain variable functionality of switch 220, low noise amplifier 232, frequency synthesizer 234, mixer 236, and analog-to-digital converter 238, for example, as understood by those of skill in the art.

The control signals from controller 240 may, for example, control switch 220 to select which of multiple antennas RF chain 230 receives the high frequency signals from.

For example, controller 240 may generate control signals which result in controller 240 receiving a group of digital signals, where each digital signal of the group is generated by RF chain 230 based on a high frequency signal received by a selected one of the antennas. In embodiments having multiple antennas each connected to one of multiple RF chains, controller 240 may generate control signals for each of the RF chains, such that controller 240 receives a group of digital signals, where each digital signal of the group is generated by one of the RF chains based on an RF signal received by the particular antenna connected thereto. Using techniques described below, controller 240 is configured to store the group of digital signals in a memory, and to determine an AoA or AoD for the received RF signals based on the group of digital signals it receives.

FIG. 2A is a schematic diagram illustrating the geometry of phase-based estimation of angle of arrival (AoA) of an RF signal received at an antenna array comprising antenna A1 and antenna A2.

As shown, the transmitted RF signal is received at an angle of arrival (AoA) θ at antennas A1 and A2. According to geometric and trigonometric principles understood by those of skill in the art, $$AoA = \theta = \arccos\left(\frac{\lambda \psi}{2\pi d}\right),$$

where
λ=wavelength of the RF signal,
ψ=the phase difference between the signals arrival at antennas A1 and A2, and
d=distance between antennas A1 and A2.

Using techniques known to those of skill in the art, a controller, such as controller 240 of receiver circuit 200 of FIG. 1B, may calculate AoA.

For example, an embodiment of receiver circuit 200 having one RF chain for each of antennas A1 and A2, assuming no carrier frequency offset, may calculate AoA as follows:

For transmitted signal $e^{-i2\pi f_h t_1} e^{-i2\pi f_f t_1}$,
where:
  $f_h$=the carrier frequency,
  $t_1$=the time of the transmitter oscillator
  $f_f$=the baseband frequency,
  the signal received at antenna A1 is $e^{-i2\pi f_h t_1} e^{-i2\pi f_f t_1} e^{i\varphi_1}$,
  where:
    $\varphi_1$=the signal phase of the received sample; and
  the signal received at antenna A2 is $e^{-i2\pi f_h t_1} e^{-i2\pi f_f t_1} e^{i\varphi_2}$,
  where:
    $\varphi_2$=the signal phase of the received sample.

The downconverted sample received at antenna A1 is:

$$e^{i2\pi f_h t_2} e^{-i2\pi f_h t_1} e^{-i2\pi f_l t_1} e^{i\varphi_1} = e^{-i2\pi f_h(t_1-t_2)} e^{-i2\pi f_l t_1} e^{i\varphi_1},$$

where:
$t_2$=the time of the receiver oscillator.
The downconverted sample received at antenna A2 is:

$$e^{i2\pi f_h t_2} e^{-i2\pi f_h t_1} e^{-i2\pi f_l t_1} e^{i\varphi_2} = e^{-i2\pi f_h(t_1-t_2)} e^{-i2\pi f_l t_1} e^{i\varphi_2},$$

The phase difference is:

$$(-2\pi f_h(t_1-t_2) - 2\pi f_l t_1 + \varphi_2) - (-2\pi f_h(t_1-t_2) - 2\pi f_l t_1 + \varphi_1) = \varphi_2 - \varphi_1.$$

$$AoA = \theta = \arccos\left(\frac{\lambda(\varphi_2 - \varphi_1)}{2\pi d}\right),$$

as discussed above.

Alternatively, an embodiment of receiver circuit 200 having one RF chain for both antennas A1 and A2, assuming no carrier frequency offset, may calculate AoA as follows:
For transmitted signal $e^{-i2\pi f_h t_1}$ $e^{-i2\pi f_l t_1}$,
where:
$f_h$=the carrier frequency,
$t_1$=the time of the transmitter oscillator
$f_l$=the baseband frequency,
the signal received at antenna A1 is $e^{-i2\pi f_h t_1}$ $e^{-i2\pi f_l t_1}$ $e^{i\varphi_1}$,
where:
$\varphi_1$=the signal phase of the received sample; and
the signal received at antenna A2 is $e^{-i2\pi f_h(t_1+T)}$ $e^{-i2\pi f_l(t_1+T)}$ $e^{i\varphi_2}$,
where:
$\varphi_2$=the signal phase of the received sample, and
T=the sampling period.
The downconverted sample received at antenna A1 is:

$$e^{i2\pi f_h t_2} e^{-i2\pi f_h t_1} e^{-i2\pi f_l t_1} e^{i\varphi_1} = e^{-i2\pi f_h(t_1-t_2)} e^{-i2\pi f_l t_1} e^{i\varphi_1},$$

where:
$t_2$=the time of the receiver oscillator.
The downconverted sample received at antenna A2 is:

$$e^{i2\pi f_h(t_2+T)} e^{-i2\pi f_h(t_1+T)} e^{-i2\pi f_l(t_1+T)} e^{i\varphi_2} = e^{-i2\pi f_h(t_1-t_2)} e^{-i2\pi f_l(t_1+T)} e^{i\varphi_2}.$$

The phase difference is:

$$(-2\pi f_h(t_1-t_2) - 2\pi f_l(t_1+T) + \varphi_2) - (-2\pi f_h(t_1-t_2) - 2\pi f_l t_1 + \varphi_1) = -2\pi f_l T + \varphi_2 - \varphi_1.$$

Therefore, $\varphi_2 - \varphi_1 = (-2\pi f_h(t_1-t_2) - 2\pi f_l(t_1+T) + \varphi_2) - (-2\pi f_h(t_1-t_2) - 2\pi f_l t_1 + \varphi_1) + 2\pi f_l T.$ Accordingly, the phase difference for calculating AoA $(\varphi_2 - \varphi_1)$ is equal to the phase difference measured+$2\pi f_l$ T.

$$AoA = \theta = \arccos\left(\frac{\lambda(\varphi_2 - \varphi_1)}{2\pi d}\right),$$

as discussed above.

FIG. 2B is a schematic diagram illustrating the geometry of phase-based estimation of angle of departure (AoD) of an RF signal transmitted by an antenna array comprising antenna A1 and antenna A2.

As shown, the RF signal is transmitted at an angle of departure (AoD) θ from antennas A1 and A2. According to geometric and trigonometric principles understood by those of skill in the art, $$AoD = \theta = \arccos\left(\frac{\lambda \psi}{2\pi d}\right),$$

where
λ=wavelength of the RF signal transmitted from antennas A1 and A2,
ψ=the phase difference between the signals arrival at antenna RX, and
d=distance between antennas A1 and A2.
Using techniques known to those of skill in the art, a controller, such as controller 240 of receiver circuit 200 of FIG. 1B, may calculate AoD.

For example, an embodiment of receiver circuit 200 having one RF chain and a single antenna A1, assuming no carrier frequency offset, may calculate AoD as follows:
For signals respectively transmitted from antennas A1 and A2:
$e^{-i2\pi f_h t_1}$ $e^{-i2\pi f_l t_1}$, and $e^{-i2\pi f_h(t_1+T)}$ $e^{-i2\pi f_l(t_1+T)}$
where:
$f_h$=the carrier frequency,
$t_1$=the time of the transmitter oscillator
$f_l$=the baseband frequency,
the first sample received at antenna RX is $e^{-i2\pi f_h t_1}$ $e^{-i2\pi f_l t_1}$ $e^{i\varphi_1}$,
where:
$\varphi_1$=the signal phase of the first sample; and
the second sample received at antenna RX is $e^{-i2\pi f_h(t_1+T)}$ $e^{-i2\pi f_l(t_1+T)}$ $e^{i\varphi_2}$,
where:
$\varphi_2$=the signal phase of the second sample, and
T=the sampling period.
The downconverted first sample is:

$$e^{i2\pi f_h t_2} e^{-i2\pi f_h t_1} e^{-i2\pi f_l t_1} e^{i\varphi_1} = e^{-i2\pi f_h(t_1-t_2)} e^{-i2\pi f_l t_1} e^{i\varphi_1},$$

where:
$t_2$=the time of the receiver oscillator.
The downconverted second sample is:

$$e^{i2\pi f_h(t_2+T)} e^{-i2\pi f_h(t_1+T)} e^{-i2\pi f_l(t_1+T)} e^{i\varphi_2} = e^{-i2\pi f_h(t_1-t_2)} e^{-i2\pi f_l(t_1+T)} e^{i\varphi_2}.$$

The phase difference is:

$$(-2\pi f_h(t_1-t_2) - 2\pi f_l(t_1+T) + \varphi_2) - (-2\pi f_h(t_1-t_2) - 2\pi f_l t_1 + \varphi_1) = -2\pi f_l T + \varphi_2 - \varphi_1.$$

Therefore, $\varphi_2 - \varphi_1 = (-2\pi f_h(t_1-t_2) - 2\pi f_l(t_1+T) + \varphi_2) - (-2\pi f_h(t_1-t_2) - 2\pi f_l t_1 + \varphi_1) + 2\pi f_l T.$ Accordingly, the phase difference for calculating AoD $(\varphi_2 - \varphi_1)$ is equal to the phase difference measured+$2\pi f_l$ T.

$$AoD = \theta = \arccos\left(\frac{\lambda(\varphi_2 - \varphi_1)}{2\pi d}\right),$$

as discussed above.

FIG. 3 is a graphic illustration of digitized samples of a received RF signal according to an example embodiment. The received RF signal may have been received by a receiver circuit, such as receiver circuit 200 of FIG. 2, having first and second receive antennas A1 and A2, and may be used to calculate AoA. Alternatively, the received RF signal may have been transmitted by a transmitter circuit, such as transmitter circuit 100 of FIG. 1, having first and second transmit antennas A1 and A2, and may be used for calculating AoD.

The discussion will refer to antennas A1 and A2. It will be understood, based on the usage context, whether the referenced antennas A1 and A2 are transmit antennas or are receive antennas.

The received RF signal is received by the receiver circuit, which generates digitized samples of the received RF signal using techniques discussed above and/or other techniques known to those of skill in the art.

Because the received RF signal is time multiplexed either when transmitted with transmit antennas A1 and A2 or received with receive antennas A1 and A2, each sampling time T1-T6 has a single digitized sample. The receiver circuit generates a digitized sample y1 for the first sampling time T1 based on the received RF signal transmitted or received with antenna A1. The receiver circuit generates a digitized sample y2 for the second sampling time T2 based on the received RF signal transmitted or received with antenna A2. The receiver circuit generates a digitized sample y3 for the third sampling time T3 based on the received RF signal transmitted or received with antenna A1. The receiver circuit generates a digitized sample y4 for the fourth sampling time T4 based on the received RF signal transmitted or received with antenna A2. The receiver circuit generates a digitized sample y5 for the fifth sampling time T5 based on the received RF signal transmitted or received with antenna A1. The receiver circuit generates a digitized sample y6 for the sixth sampling time T6 based on the received RF signal transmitted or received with antenna A2.

As understood by those of skill in the art, sampling times may be spaced apart by a switching time, during which, for example, either the transmitter circuit disconnects an amplifier from one of transmit antennas A1 and A2 and connects the amplifier to the other of transmit antennas A1 and A2, or the receiver circuit disconnects an amplifier from one of receive antennas A1 and A2 and connects the amplifier to the other of receive antennas A1 and A2.

The digital samples generated by the receiver circuit may be used to calculate AoA or AoD. However, because calculations of AoA or AoD are preferably made with digitized samples for the same sampling time, additional digital samples may be calculated based on the digitized samples generated by the RF chain of the receiver circuit.

FIG. 4 is a graphic illustration of received and calculated samples which may be used for calculating AoA or AoD. Samples y1 of sampling time T1, y3 of sampling time T3, and y5 of sampling time T5, are generated by the receiver circuit by digitizing the received RF signal of transmit or receive antenna A1 using techniques discussed elsewhere herein, or using other techniques understood by those of skill in the art. Similarly, samples y2 of sampling time T2, y4 of sampling time T4, and y6 of sampling time T6 are generated by the receiver circuit by digitizing the received RF signal of transmit or receive antenna A2 using techniques discussed elsewhere herein, or using other techniques understood by those of skill in the art. In addition, samples y1c2 of sampling time T1, y2c1 of sampling time T2, y3c2 of sampling time T3, y4c1 of sampling time T4, y5c2 of sampling time T5, and y6c1 of sampling time T6 are calculated by the receiver circuit based on digitized samples of the received RF signal using techniques discussed elsewhere herein, or using other techniques understood by those of skill in the art.

In some embodiments, samples y1c2 of sampling time T1, y3c2 of sampling time T3, and y5c2 of sampling time T5 are calculated based on digitized samples of the received RF signal transmitted or received by antenna A2. For example, samples y1c2 of sampling time T1, y3c2 of sampling time T3, and y5c2 of sampling time T5 may be calculated based at least in part on digitized sample y2 of sampling time T2, digitized sample y4 of sampling time T4, and digitized sample y6 of sampling time T6.

For example, a first digital input signal including digitized sample y2 of sampling time T2, digitized sample y4 of sampling time T4, and digitized sample y6 of sampling time T6 may be input to a digital filter, such as a first digital FIR filter. Any suitable digital FIR filter may be used.

As understood by those of skill in the art, as part of the filtering process, the first digital FIR filter may oversample the first digital signal input thereto, and may, consequently, generate digital samples corresponding with times between the sampling times of the digitized samples of the first digital input signal.

For example, the first digital input signal including digitized sample y2 of sampling time T2, digitized sample y4 of sampling time T4, and digitized sample y6 of sampling time T6 may be input to the first digital FIR oversampling by a factor of 2. Based at least in part on digitized sample y2, digitized sample y4, and digitized sample y6 of the first digital input signal, the first digital FIR filter may calculate samples y1c2 of sampling time T1, y3c2 of sampling time T3, and y5c2 of sampling time T5, as illustrated in FIG. 4.

In some embodiments, y2c1 of sampling time T2, y4c1 of sampling time T4, and y6c1 of sampling time T6 are calculated based on digitized samples of the received RF signal transmitted or received by antenna A1. For example, samples y2c1 of sampling time T2, y4c1 of sampling time T4, and y6c1 of sampling time T6 may be calculated based on digitized sample y1 of sampling time T1, digitized sample y3 of sampling time T3, and digitized sample y5 of sampling time T5.

For example, a second digital input signal including digitized sample y1 of sampling time T1, digitized sample y3 of sampling time T3, and digitized sample y5 of sampling time T5 may be input to a digital filter, such as a second digital FIR filter. Any suitable digital FIR filter may be used.

As understood by those of skill in the art, as part of the filtering process, the second digital FIR filter may oversample the digital signal input thereto, and may, consequently, generate digital samples corresponding with times between the sampling times of the digitized samples of the second digital input signal.

For example, the second digital input signal including digitized sample y1 of sampling time T1, digitized sample y3 of sampling time T3, and digitized sample y5 of sampling time T5 may be input to the second digital FIR oversampling by a factor of 2. Based at least in part on digitized sample y1, digitized sample y3, and digitized sample y5 of the second digital input signal, the digital FIR filter may calculate samples y2c1 of sampling time T2, y4c1 of sampling time T4, and y6c1 of sampling time T6, as illustrated in FIG. 4.

Using techniques discussed herein, and/or other techniques known to those of skill in the art, the receiver circuit may calculate a measured AoA or AoD based on the digitized and calculated samples illustrated in FIG. 4.

For example, a measured AoA or AoD may be calculated based on the digitized and calculated samples of multiple sampling times according to, for example, a Multiple Signal Classification (MUSIC) AoA or AoD algorithm, as understood by those of skill in the art.

Alternatively, an estimate of AoA or AoD may be calculated for each sampling time. For example, each of sample pairs y1 and y1c2, y2c1 and y2, y3 and y3c2, y4c1 and y4, y5 and y5c2, and y6c1 and y6 may be used to calculate an estimate of AoA or AoD. In addition, the calculated estimates of AoA or AoD may be used to calculate a measured AoA or AoD using any of the techniques described herein and/or any other techniques known to those of skill in the art. For example, the measured AoA or AoD may be calculated as an average of the estimates of AoA or AoD.

FIG. 5 is a graphic illustration of digitized samples of a received RF signal according to an example embodiment. The received RF signal may have been received by a receiver circuit, such as receiver circuit 200 of FIG. 2, having receive antennas A1-AN, and may be used to calculate AoA. Alternatively, the received RF signal may have been transmitted by a transmitter circuit, such as transmitter circuit 100 of FIG. 1, having antennas A1-AN, and may be used for calculating AoD.

The discussion will refer to antennas A1-AN. It will be understood, based on the usage context, whether the referenced antennas A1-AN are transmit antennas or are receive antennas.

The received RF signal is received by the receiver circuit, which generates digitized samples of the received RF signal using techniques discussed above and/or other techniques known to those of skill in the art.

Because the received RF signal is time multiplexed either when transmitted with transmit antennas A1-AN or received with receive antennas A1-AN, each sampling time T1-TN has a single digitized sample. The receiver circuit generates a digitized sample y1 for the first sampling time T1 based on the received RF signal transmitted or received with antenna A1. The receiver circuit generates a digitized sample yN for the Nth sampling time TN based on the received RF signal transmitted or received with antenna AN. The receiver circuit generates another digitized sample yx for each of the other sampling times Tx between T1 and TN based on the received RF signal transmitted or received with an antenna Ax. As understood by those of skill in the art, the receiver circuit continues to generate samples based on the received RF signal with a repeating pattern of the sample generation scheme illustrated in FIG. 5.

As understood by those of skill in the art, sampling times may be spaced apart by a switching time, during which, for example, either the transmitter circuit disconnects an amplifier from one of the transmit antennas A1-AN and connects the amplifier to a next transmit antenna, or the receiver circuit disconnects an amplifier from one of receive antennas A1-AN and connects the amplifier to a next receive antennas.

The digital samples generated by the receiver circuit may be used to calculate AoA or AoD. However, because calculations of AoA or AoD are preferably made with digitized samples for the same sampling time, additional digital samples may be calculated based on the digitized samples generated by the RF chain of the receiver circuit.

FIG. 6 is a graphic illustration of received and calculated samples which may be used for calculating AoA or AoD. The receiver circuit generates a digitized sample y1 for the first sampling time T1 based on the received RF signal transmitted or received with antenna A1. The receiver circuit generates a digitized sample y2 for the second sampling time T2 based on the received RF signal transmitted or received with antenna A2. The receiver circuit also generates a digitized sample yN−1 for the N−1th sampling time TN−1 based on the received RF signal transmitted or received with antenna AN−1. The receiver circuit also generates a digitized sample yN for the Nth sampling time TN based on the received RF signal transmitted or received with antenna AN. The receiver circuit generates another digitized sample yx for each of the other sampling times Tx between sampling times T2 and TN−1 based on the received RF signal transmitted or received with an antenna Ax between antennas A2 and AN−1. As understood by those of skill in the art, the receiver circuit continues to generate samples based on the received RF signal with a repeating pattern of the sample generation scheme illustrated in FIG. 6.

In addition, samples y1c2–y1cN of sampling time T1, y2c1, y2cN−1, and y2cN of sampling time T2, yN−1c1, yN−1c2, and yN to 1cN of sampling time TN−1, yNc1 to yNcN−1 of sampling time TN, and other samples corresponding with the antennas and sampling times not identified in FIG. 6 are calculated by the receiver circuit based on digitized samples of the received RF signal using techniques discussed elsewhere herein, or using other techniques understood by those of skill in the art.

In some embodiments, the samples corresponding with each particular antenna are calculated based on digitized samples calculated based on the RF signal transmitted or received by the particular antenna. For example, the samples corresponding with antenna Ax are calculated based on digitized samples calculated based on the RF signal transmitted or received by antenna Ax.

For example, a first digital input signal including digitized sample y1 of sampling time T1 and other digitized samples (not shown) calculated based on the RF signal transmitted or received by antenna A1, for example, of sampling times TN+1, T2N+1, etc. (not shown) may be input to a digital filter, such as a first digital FIR filter. Any suitable digital FIR filter may be used.

As understood by those of skill in the art, as part of the filtering process, the first digital FIR filter may oversample the first digital signal input thereto, and may, consequently, generate digital samples corresponding with times between the sampling times of the digitized samples of the first digital input signal.

For example, the first digital input signal including digitized sample y1 of sampling time T1 and the other digitized samples may be input to the first digital FIR oversampling by a factor of N. Based on the first digital input signal, the first digital FIR filter may calculate samples y2c1–yNc1 of sampling times T2–TN, as illustrated in FIG. 6.

In addition, an xth digital input signal including digitized sample yx of sampling time Tx, and other digitized samples (not shown) calculated based on the RF signal transmitted or received by antenna Ax, for example, of sampling times TN+x, T2N+x, etc. (not shown) may be input to a digital filter, such as a first digital FIR filter. Any suitable digital FIR filter may be used.

As understood by those of skill in the art, as part of the filtering process, the xth digital FIR filter may oversample the digital signal input thereto, and may, consequently, generate digital samples corresponding with times between the sampling times of the digitized samples of the xth digital input signal.

For example, the xth digital input signal including digitized sample yx of sampling time Tx and the other digitized samples may be input to the xth digital FIR oversampling by a factor of N. Based on the xth digital input signal, the xth digital FIR filter may calculate samples for sampling times T1 to Tx−1 and Tx+1 to TN, as illustrated in FIG. 6.

Accordingly, N digital filters may be used to calculate samples to be used with the digitized samples of FIG. 5.

Using techniques discussed herein, and/or other techniques known to those of skill in the art, the receiver circuit may calculate a measured AoA or AoD based on the digitized and calculated samples illustrated in FIG. 6.

For example, a measured AoA or AoD may be calculated based on the digitized and calculated samples according to a Multiple Signal Classification (MUSIC) AoA or AoD algorithm, as understood by those of skill in the art.

Alternatively, an estimate of AoA or AoD may be calculated for each sampling time. In addition, the calculated estimates of AoA or AoD may be used to calculate a measured AoA or AoD using any of the techniques described herein and/or any other techniques known to those of skill in the art. For example, the measured AoA or AoD may be calculated as an average of the estimates of AoA or AoD.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A receiver circuit, comprising:
    N receiver antennas configured to receive a plurality of radiofrequency (RF) signals transmitted from a transmitter circuit comprising one or more transmit antennas, wherein N is an integer greater than 1;
    an RF chain selectably connectable to each of the N receiver antennas and configured to generate a plurality of digitized samples of the received RF signals; and
    a controller configured, in each nth sampling time of a repeating cycle of N sampling times, to:
        direct the RF chain to couple with a respective nth receiver antenna of the N receiver antennas;
        receive a respective nth portion of the digitized samples as received in the nth sampling time from the nth receiver antenna;
        calculate, for each of the N−1 receiver antennas other than the nth receiver antenna, a respective nth set of additional samples for the nth sampling time based on oversampling the plurality of digitized samples; and
        calculate a measured angle of arrival or angle of departure (AoA or AoD) of the RF signals for the nth sampling time based on the nth portion of the digitized samples and the calculated nth sets of additional samples.

2. The receiver circuit of claim 1, wherein a first set of digitized samples is samples of the RF signals received by a first receive antenna of the receiver circuit, and wherein a second set of digitized samples is samples of the RF signals received by a second receive antenna of the receiver circuit.

3. The receiver circuit of claim 2, wherein a first set of additional samples is calculated based on the first set of digitized samples, and wherein a second set of additional samples is calculated based on the second set of digitized samples.

4. The receiver circuit of claim 2, wherein the first set of digitized samples is samples of the RF signals taken at a plurality of first sample times, wherein the second set of digitized samples is samples of the RF signals taken at a plurality of second sample times, and wherein each of the first sample times is different from each of the second sample times.

5. The receiver circuit of claim 4, wherein each of the additional samples of the first set of additional samples corresponds with one of the second sample times, and wherein each of the additional samples of the second set of additional samples corresponds with one of the first sample times.

6. The receiver circuit of claim 5, wherein the controller is configured to calculate the measured AoA or AoD based on the digitized samples and the calculated additional samples corresponding with the plurality of first sample times and corresponding with the plurality of second sample times.

7. The receiver circuit of claim 1, wherein the RF signals are transmitted by a single transmit antenna of the transmitter circuit.

8. The receiver circuit of claim 1, wherein the RF signals are transmitted by a plurality of transmit antennas of the transmitter circuit.

9. A method of utilizing a receiver circuit, the method comprising:
    with N receiver antennas, receiving a plurality of radiofrequency (RF) signals transmitted from a transmitter circuit comprising one or more transmit antennas, wherein N is an integer greater than 1;
    with an RF chain selectably connectable to each of the N receiver antennas, generating a plurality of digitized samples of the received RF signals;
    with a controller, in each nth sampling time of a repeating cycle of N sampling times:
        directing the RF chain to couple with a respective nth receiver antenna of the N receiver antennas;
        receiving a respective nth portion of the digitized samples as received in the nth sampling time from the nth receiver antenna;

calculating, for each of the N−1 receiver antennas other than the nth receiver antenna, a respective nth set of additional samples for the nth sampling time based on oversampling the plurality of digitized samples; and calculating a measured angle of arrival or angle of departure (AoA or AoD) of the RF signals for the nth sampling time based on the nth portion of the digitized samples and the calculated nth sets of additional samples.

10. The method of claim 9, wherein a first set of digitized samples is samples of the RF signals received by a first receive antenna of the receiver circuit, and wherein a second set of digitized samples is samples of the RF signals received by a second receive antenna of the receiver circuit.

11. The method of claim 10, wherein a first set of additional samples is calculated based on the first set of digitized samples, and wherein a second set of additional samples is calculated based on the second set of digitized samples.

12. The method of claim 10, wherein the first set of digitized samples is samples of the RF signals taken at a plurality of first sample times, wherein the second set of digitized samples is samples of the RF signals taken at a plurality of second sample times, and wherein each of the first sample times is different from each of the second sample times.

13. The method of claim 12, wherein each of the additional samples of the first set of additional samples corresponds with one of the second sample times, and wherein each of the additional samples of the second set of additional samples corresponds with one of the first sample times.

14. The method of claim 13, further comprising, with the controller, calculating the measured AoA or AoD based on the digitized samples and the calculated additional samples corresponding with the plurality of first sample times and corresponding with the plurality of second sample times.

15. The method of claim 9, wherein the RF signals are transmitted by a single transmit antenna of the transmitter circuit.

16. The method of claim 9, wherein the RF signals are transmitted by a plurality of transmit antennas of the transmitter circuit.

* * * * *